United States Patent
Bachmann et al.

(10) Patent No.: US 6,228,896 B1
(45) Date of Patent: *May 8, 2001

(54) PROCESS FOR THE PREPARATION OF VERY ACIDIC CATION EXCHANGERS

(75) Inventors: Reinhard Bachmann, Engelsdorf; Lothar Feistel, Delitzsch; Rüdiger Seidel, Sandersdorf; Karl-Heinz Siekiera, Wolfen, all of (DE)

(73) Assignee: IAB Ionennaustauscher GmbH Bitterfeld, Greppin (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,367

(22) PCT Filed: Dec. 20, 1996

(86) PCT No.: PCT/EP96/05784

§ 371 Date: Jun. 17, 1998

§ 102(e) Date: Jun. 17, 1998

(87) PCT Pub. No.: WO97/23517

PCT Pub. Date: Jul. 3, 1997

(30) Foreign Application Priority Data

Dec. 21, 1995 (DE) ................................. 195 48 012
Oct. 24, 1996 (DE) ................................. 196 44 217

(51) Int. Cl.⁷ ........................................................ C08F 8/36
(52) U.S. Cl. ........................ 521/33; 525/332.2; 525/344
(58) Field of Search ................................ 521/33; 525/344

(56) References Cited

U.S. PATENT DOCUMENTS

| 2,399,007 | 4/1946 | Desrosiers . |
| 2,500,149 | 3/1950 | Boyer . |
| 2,597,438 | * 5/1952 | Bodamer . |
| 2,809,959 | 10/1957 | Roth . |
| 4,157,432 | 6/1979 | Lundberg et al. . |
| 4,380,590 | 4/1983 | Chong . |
| 4,382,124 | 5/1983 | Meitzner et al. . |
| 5,244,926 | * 9/1993 | Harris . |
| 5,248,435 | 9/1993 | Morita et al. . |

FOREIGN PATENT DOCUMENTS

| 1 031 514 | 6/1958 | (DE) . |
| 1 233 143 | 1/1967 | (DE) . |
| 0002346 | * 6/1979 | (EP) . |
| 0009395 | * 4/1980 | (EP) . |

OTHER PUBLICATIONS

J. Chem, Soc. 1949, pp. 3299–3303.
Datenbank: "Chemical Abstracts" (Datenanbieter: STN) Abstr. 125:35413, Columbus, OH, USA (JP–A–08 089–818, Rohm & Haas, USA Apr. 9, 1996, XP002029166).

* cited by examiner

Primary Examiner—Bernard Lipman
(74) Attorney, Agent, or Firm—Norris McLaughlin & Marcus

(57) ABSTRACT

The invention relates to a process for the preparation of mechanically and osmotically stable, high-capacity strongly acidic cation exchangers having a particle size of $\geq 0.1$ mm by sulphonation of gel-like or porous bead polymers with sulphuric acid without the use of inert chlorine-containing swelling agents and/or of comonomers based on acrylonitrile. According to the invention, such strongly acidic cation exchangers can be prepared by sulphonation of gel-like and porous bead polymers, prepared by copolymerization of styrene and divinylbenzene having a crosslinker content of up to 65% by weight of divinylbenzene with and without inert composition, with 80–96% strength sulphuric acid at temperatures of 125–180° C. and a reaction time of up to 20 h. According to the novel process, strongly acidic cation exchangers can be prepared without the use of the inert chlorine-containing environmentally harmful swelling agent 1,2-dichloroethane, with quality features and material characteristics identical or similar to products produced by the conventional processes.

7 Claims, No Drawings

PROCESS FOR THE PREPARATION OF VERY ACIDIC CATION EXCHANGERS

The present invention relates to a process for the preparation of mechanically and osmotically stable, high-capacity strongly acidic cation exchangers having a particle size of 0.1 mm or larger by sulphonation of gel-like or porous bead polymers with sulphuric acid without the use of inert chlorine-containing swelling agents and/or of comonomers based on acrylonitrile. The literature discloses a large number of investigations which are concerned with the preparation of mechanically and osmotically stable cation exchangers having optimum properties in terms of capacity. According to said literature, industrially useful strongly acidic cation exchangers are prepared mainly by sulphonation of bead-like styrene/divinylbenzene copolymers, the polymer being preswelled with a deficit of an inert swelling agent and subsequently sulphonated and worked up. In particular, 1,2-dichloroethane has proved a particularly useful inert swelling agent. Thus, U.S. Pat. No. 5,248,435 describes a process for the sulphonation of porous styrene/divinylbenzene copolymers with the addition of chlorine-containing swelling agents with a 95% strength sulphuric acid at 80° C. However, owing to its easy ignitability, toxic and carcinogenic properties and the systemic effects and the dangerous decomposition product hydrogen chloride, the use of 1,2-dichloroethane has become critical. The environmentally safe handling of the inert swelling agent requires considerable expensive technological and technical effort.

The gaseous and liquid waste products of the production process are contaminated with dichloroethane since it can be only incompletely recovered from the sulphonation process and traces must be removed from the end product by special treatments. With regard to safety, 1,2-dichloroethane must be utilized or disposed of after use, since improper elimination endangers the environment. This requires downstream expensive environmental technologies, such as incineration in approved chlorine-resistant plants or working up in licenced regeneration plants and circulation procedures, adsorption or stripping.

The route for the preparation of industrially useful strongly acidic cation exchangers having a particle size of 0.1 mm upwards without the use of environmentally unsafe inert swelling agents such as 1,2-dichloroethane, was not pursued in the past as long as the known industrial processes using the inert chlorine-containing swelling agent were regarded as safe. The development with the aim of obtaining industrially useful strongly acidic cation exchangers without inert swelling agents therefore preceded the development phase involving the use of swelling agents.

Cation exchangers which are obtainable by sulphonation of crosslinked bead polymers of monovinylaromatics and polyvinylaromatics, preferably of styrene and divinylbenzene—the amount of crosslinking agent being 3 to 11%—were described in U.S. Pat. No. 2,366,007. In the preparation of these exchangers, the starting materials used were polymers which were obtained by polymerization of the monomers in the presence of small amounts of initiators with slowly increasing temperatures over several days. The sulphonation temperatures were above 100° C. but substantial particle disintegration nevertheless occurred during the hydration.

It is also known to sulphonate styrene/divinylbenzene bead polymers by a treatment with sulphuric acid at 100° C. in the presence of silver sulphate (J. Chem. Soc. 1949, page 3303). The products thus obtained exhibited a low mechanical stability and an unsatisfactory exchange capacity.

Attempts were furthermore made to improve the mechanical stability by carrying out the sulphonation with chlorosulphonic acid in liquid sulphur dioxide (U.S. Pat. No. 2,809,959; DAS (German Published Specification) 1,031, 514). However, only partially sulphonated products were obtained by this method. In addition, chlorosulphonic acid and liquid sulphur dioxide are technically not simple to handle.

The application DE-AS (German Published Specification) 974,216 had the same object. Here, before the sulphonation with chlorosulphonic acid, the styrene/divinylbenzene copolymer is subjected to heating to achieve high hardness or the compensation of internal stresses, by heating the polymer for 15 minutes to 180° C. and then cooling it to room temperature over a period of 16 h. The polymers thus prepared are sulphonated by the action of chlorosulphonic acid at temperatures of 50 to 80° C.

DE-AS (German Published Specification) 1,233,143 describes a process having more advantageous reaction conditions, in which polymers of styrene, divinylbenzene, acrylonitrile or methacrylonitrile are used and are sulphonated with 96 to 99.1% strength sulphuric acid at reaction temperatures between 80 and 120° C. This procedure has proved advantageous for degress of crosslinking of the divinylbenzene of 14–29% by weight. The disadvantage of this process is the use of acrylonitrile, which is a hazardous substance and water pollutant and, as with the use of swelling agents, results in expensive safety and environmental measures.

EP 0 009 395 describes the preparation of strongly acidic cationic exchangers for the range of extremely small particles having a particle size of 0.01–1.5 μm by sulphonation of styrene/divinylbenzene copolymers with sulphuric acid without the addition of inert swelling agents. The preparation of strongly acidic cation exchangers in this particle size range is, except for special applications, of little importance for industrial use, which requires particle sizes of 0.3–1.2 mm. The strongly acidic cation exchangers having the particle size from 0.1 mm upwards cannot be prepared by means of sulphonation without the addition of DCE by the process described.

It is the object of the invention to find a process by means of which mechanically and osmotically stable, high-capacity strongly acidic cation exchangers having a particle size from 0.1 mm upwards can be prepared by sulphonation of gel-like or porous styrene/divinylbenzene copolymers by means of technically convenient sulphonating agents without the use of inert chlorine-containing swelling agents and/or of comonomers based on acrylonitrile.

It has now been found that strongly acidic cation exchangers having the required properties can be prepared, according to the invention, from gel-like or porous styrene/divinylbenzene copolymers, also referred to as bead polymers, whose crosslinker content of divinylbenzene is 1–65% by weight, by sulphonating these for up to 20 hours at temperatures of 125 to 180° C. with a sulphuric acid whose concentration is 80 to 96%. The strongly acidic cation exchanger is then hydrated and washed out by the known methods.

The gel-like or porous three-dimensionally crosslinked copolymers are products which are obtained by bead polymerization of a mixture of the monomers styrene and technical-grade divinylbenzene of commercial composition with or without the addition of inert compositions, such as hydrocarbons having a boiling range between 120–220° C.

It was furthermore found that strongly acidic cation exchangers have similar or better characteristic quality features, as shown in the tables, in comparison with the products produced still conventional processes if, preferably within the limits of the reaction conditions according to the invention, porous bead polymers are sulphonated at 130–140° C. and gel-like bead polymers are sulphonated at 160–170° C. with 86–94% strength sulphuric acid for 8–12 hours. The higher temperatures found are required for obtaining a completely smooth particle surface in the case of gel-like bead polymers since, at sulphonation temperatures below 160° C., the surface has characteristic indentations, known as orange peel among those skilled in the art. The bead polymers sulphonated by the process according to the invention are hydrated and worked up by known methods. Mechanically and osmotically stable, high-capacity strongly acidic cation exchangers having a particle size of ≧0.1 mm can be prepared by the process according to the invention, as demonstrated by the characteristic quality features shown in Tables 1-[lacuna]. The sulphonation process according to the invention is distinguished by the following advantages compared with the known industrial processes:

Even coarse-particled bead polymers can be sulphonated with sulphuric acid

Working with the sulphonating reagents, such as sulphur trioxide and chlorosulphonic acid, which are substantially more difficult to handle is thus dispensed with.

The preswelling of the bead polymers with an inert chlorine-containing swelling agent, such as 1,2-dichloroethane, can be dispensed with.

This dispenses with the complicated and expensive removal and recovery of 1,2-dichloroethane from the end products, by-products and waste products of the sulphonation.

In the copolymerization of styrene and divinylbenzene, there is no need to add any comonomers, such as acrylonitrile or methacrylonitrile, which promote strength and facilitate the sulphonation but endanger the environment.

In Examples 1–3, the preparation of strongly acidic cation exchangers by sulphonation of gel-like (Examples 1 and 2) and porous (Example 3) bead polymers with sulphuric acid by the process according to the invention is described in more detail.

In the overviews in the form of tables and following the examples, the characteristic quality features and characteristic material data of strongly acidic cation exchangers prepared according to the invention are compared with the products prepared in the conventional manner with the use of the inert chlorine-containing swelling agent 1,2-dichloroethane.

Table 1 shows the average values of in each case at least 3 sulphonations of gel-like bead polymers, under the different conditions. The characteristic data make it clear that there are no significant differences between the four sulphonation variants compared. The mechanical and osmotic properties, which are characterized by the spherical quality, abrasion and the fast cycling behaviour, are particularly noteworthy.

Table 2 shows a comparison of the end products of 3 sulphonation variants of gel-like bead polymer. The effective volume capacity (EVC) under various ion exchange conditions is compared.

The values are completely comparable with conventional sulphonation or have slight advantages in the case of the 135° C. variant. The gel-like bead polymers sulphonated at this temperature have the typical features, the orange peel surface. If, depending on the applications, a smooth surface of the particle is preferred, sulphonation must be effected at temperatures above 160° C.

Table 3 shows a comparison of the sulphonation of a porous polymer with and without dichloroethane analogously to Example 3. These are likewise average values of at least 4 experiments. This comparison too makes it clear that highly crosslinked bead polymers can be sulphonated without swelling agents, and completely comparable end products are obtained.

EXAMPLES

Example 1

In a sulphonation flask having a thermometer and stirrer, 60 g of a spherical gel-like styrene/divinylbenzene copolymer having a particle size of 0.1–0.8 mm, which was crosslinked with up to 65% by weight of divinylbenzene, are stirred in 240 ml of 88.3% strength sulphuric acid and heated to 165° C. in the course of 90 minutes and stirred at this temperature for 10 hours. Thereafter, cooling to room temperature is effected in the course of 120–180 minutes, the sulphuric acid is separated off and the adhering sulphuric acid is washed out stepwise with sulphuric acid of decreasing concentration. For strongly acidic cation exchangers which are prepared under these conditions and for which spherical gel-like styrene/divinylbenzene copolymers having the following crosslinker content were used, the testing of important characteristic data gives the following values:

| Serial No. | Crosslinker content (% by weight) | Total weight capacity (TWC) (mmol/g) | Water content (WC) (%) | Spherical quality (SQ) |
|---|---|---|---|---|
| 1 | 1.8 | 4.74 | 81.7 | 0.94 |
| 2 | 4.3 | 5.31 | 65.6 | 0.98 |
| 3 | 5.8 | 5.30 | 61.8 | 0.96 |
| 4 | 7.8 | 5.18 | 52.2 | 0.98 |
| 5 | 10.0 | 4.63 | 48.0 | 0.97 |

Example 2

A copolymer having a degree of crosslinking of 7.8% of divinylbenzene was sulphonated by the same procedure as in Example 1, with varied reaction conditions:

| Serial No. | Reaction temperature (° C.) | Reaction time (h) | $H_2SO_4$ (%) | TWC (mmol/g) | WC (%) | SQ |
|---|---|---|---|---|---|---|
| 1 | 135 | 10.0 | 94.6 | 5.23 | 50.8 | 0.98 |
| 2 | 165 | 2.0 | 84.0 | 3.11 | 30.9 | 0.99 |
| 3 | 165 | 2.5 | 82.0 | 1.10 | 12.9 | 0.99 |
| 4 | 165 | 10.0 | 85.7 | 4.98 | 52.0 | 0.98 |
| 5 | 165 | 10.0 | 88.3 | 5.18 | 52.2 | 0.98 |
| 6 | 170 | 6.0 | 87.0 | 4.99 | 52.1 | 0.97 |

Example 3

In a sulphonation flask equipped as in Example 1, 60 g of a spherical macroporous styrene/divinylbenzene copolymer which was crosslinked with up to 65% by weight of divinylbenzene are stirred in 240 ml of 94.3% strength sulphuric acid, heated to 130° C. in the course of 60 minutes and stirred at this temperature for 8 h and separated from the sulphuric acid, and the adhering sulphuric acid was washed out stepwise by means of more dilute sulphuric acid. For strongly acidic cation exchangers which were prepared according to this method and for which spherical, macroporous styrene/divinylbenzene copolymers having the following crosslinker content were used, the testing of important characteristic data gave the following values:

|  | Serial No. | | |
| --- | --- | --- | --- |
|  | 1 | 2 | 3 |
| Crosslinker content % by weight | 14.5 | 15 | 20 |
| Total weight capacity (mmol/g) | 4.76 | 4.58 | 4.63 |
| Volume capacity (mmol(ml) | 1.87 | 2.04 | 1.88 |
| Water content (%) | 51.8 | 44.4 | 49.8 |
| Spherical quality | 1.0 | 0.92 | 0.98 |
| Fracture (%) | 0 | 2 | 1 |

TABLE 1

Sulphonation of a gel-like bead polymer with 7.8% of divinylbenzene-crosslinked styrene polymer with and without inert chlorine-containing swelling agent 1,2-dichloroethane

| Characteristic data | Dimension | Sulphonation temperatures (° C.) | | | |
| --- | --- | --- | --- | --- | --- |
| | | 105 with DCE | 130 with DCE | 135 without | 165 without |
| $H_2SO_4$ concentration | % | 94 | 94 | 94.6 | 88.3 |
| Reaction time | h | 6 | 10 | 10 | 10 |
| Total weight capacity | mmol/g | 5.14 | 5.19 | 5.23 | 5.18 |
| Total volume capacity | mmol/ml | 2.00 | 2.14 | 2.11 | 2.06 |
| Water content | % | 51.7 | 52.7 | 50.8 | 52.2 |
| Spherical quality | | 0.97 | 0.98 | 0.98 | 0.98 |
| Abrasion | % | 2.5 | 1.5 | 2.0 | 3.3 |
| Spherical quality after rapid cycling | | 0.66 | 0.81 | 0.87 | 0.7 |
| Fracture fraction after rapid cycling | % | 2.0 | 2.0 | 1.7 | 4.0 |
| Particle size $d_{95}$ | mm | 0.41 | 0.42 | 0.43 | 0.41 |
| Particle size $d_5$ | mm | 0.99 | 0.97 | 0.95 | 0.98 |
| Undersize | mm | 0.87 | 0.68 | 0.53 | 1.1 |

TABLE 2

Comparison of the effective volume capacity of gel-like bead polymers sulphonated with and without inert chlorine-containing sulphonating agent 1,2-dichloroethane with 7.8% of divinylbenzene-crosslinked styrene polymer

| Characteristic data | Dimension | Sulphonation temperature (° C.) | | |
| --- | --- | --- | --- | --- |
| | | 105 with DCE | 135 without DCE | 165 without DCE |
| $H_2SO_4$ concentration | % | 94 | 94.6 | 88.3 |
| Reaction time | h | 6 | 10 | 10 |
| Effective volume capacity | | | | |
| $Na^+/Ca^{2+}$ | mol/l | 1.44 | 1.55 | 1.42 |
| Cocurrent | BV | | | |
| Wash water | (Bed volume) | 4–6 | 4–6 | 4–6 |
| Effective volume capacity | | | | |
| $H^+/Ca^{2+}$ | mol/l | 1.30 | 1.35 | 1.33 |
| Cocurrent | | | | |

TABLE 2-continued

Comparison of the effective volume capacity of gel-like bead polymers sulphonated with and without inert chlorine-containing sulphonating agent 1,2-dichloroethane with 7.8% of divinylbenzene-crosslinked styrene polymer

| Characteristic data | Dimension | Sulphonation temperature (° C.) | | |
| --- | --- | --- | --- | --- |
| | | 105 with DCE | 135 without DCE | 165 without DCE |
| Wash water | BV | 4–5 | 4–5 | 4–5 |
| Effective volume capacity | | | | |
| $Na^+/Ca^{2+}$ | | | | |
| Up-current | | | | |
| 20 m/h | mol/l | 1.11 | 1.16 | 1.09 |
| 40 m/h | mol/l | 1.05 | 1.01 | 1.02 |
| Effective volume capacity | | | | |
| $H^+/Ca^{2+}$ | | | | |
| Up-current | | | | |
| 20 m/h | mol/l | 0.87 | 1.05 | 1.03 |
| 40 m/h | mol/l | 0.76 | 1.01 | 0.99 |

TABLE 3

Sulphonation of a porous bead polymer with 14.5% of divinylbenzene-crosslinked styrene polymers with and without inert chlorine-containing swelling agent dichloroethane (DCE)

| Reaction conditions according to Example 3 | | Sulphonation temperature (° C.) | |
| --- | --- | --- | --- |
| | | 120 | 130 |
| Characteristic data | Dimension | with DCE | without DCE |
| Total weight capacity | mmol/g | 4.81 | 4.79 |
| Total volume capacity | mmol/ml | 1.99 | 2.01 |
| Water content | % | 49.4 | 48.5 |
| Spherical quality | | 0.93 | 0.98 |
| Fracture | % | 0 | 0.8 |
| Particle size $d_{95}$ | mm | 0.42 | 0.41 |
| Particle size $d_5$ | mm | 1.04 | 1.01 |
| Effective volume capacity $Na^+/Ca^{2+}$ | mol/l | 1.08 | 1.16 |
| Wash water requirement | BV | 4.2 | 5.5 |
| Effective volume capacity $H^+/Ca^{2+}$ | mol/l | 1.02 | 1.06 |
| Wash water | BV | 4 | 4 |

What is claimed is:

1. Process for the preparation of strongly acidic cation exchangers having a particle size of ≧0.1 mm by sulphonation of gel-like or porous styrene/divinylbenzene copolymers (bead polymers) having a crosslinker content of 1–65% by weight of divinylbenzene, which are obtained by copolymerization of styrene and divinylbenzene with or without the addition of up to 45% of inert composition in the boiling range of 120° C. to 220° C., with sulphuric acid comprising sulphonating the bead polymers without the addition of inert chlorine-containing swelling agents with the use of concentrated sulphuric acid having a content of 80–96% at temperatures in the range from 125 to 180° C. for up to 20 hours, said sulphonated bead polymers being hydrated and washed out by known methods.

2. Process for the preparation of strongly acidic cation exchangers according to claim 1, wherein the porous bead polymers are sulphonated at 125–180° C.

3. Process for the preparation of strongly acidic cation exchangers according to claim 1, wherein the gel-like bead polymers are sulphonated at 125–180° C.

4. Process for the preparation of strongly acidic cation exchangers according to claim 1, wherein the bead polymers are sulphonated with 86–94% strength sulphuric acid.

5. Process for the preparation of strongly acidic cation exchangers according to claim 1, wherein the bead polymers are sulphonated for 8–12 hours.

6. Process for the preparation of strongly acidic cation exchangers according to claim 1, wherein the porous bead polymers are sulphonated at 130–140° C.

7. Process for the preparation of strongly acidic cation exchangers according to claim 1, wherein the gel-like bead polymers are sulphonated at 160–170° C.

* * * * *

UNITED STATES PATENT AND TRADEMARK OFFICE
CERTIFICATE OF CORRECTION

PATENT NO. : 6,228,896 B1
DATED : May 8, 2001
INVENTOR(S) : Reinhard Bachmann et al.

It is certified that error appears in the above-identified patent and that said Letters Patent is hereby corrected as shown below:

<u>Title page,</u>
Item [56], References Cited, U.S. PATENT DOCUMENTS, "5,248,435" reference, change "9/1993" to -- 8/1993 --

Signed and Sealed this

Second Day of December, 2003

JAMES E. ROGAN
*Director of the United States Patent and Trademark Office*